April 1, 1941.  W. H. ADAMS  2,236,638
BLOCK KEYBOARD FOR MUSICAL INSTRUCTION
Filed March 3, 1939
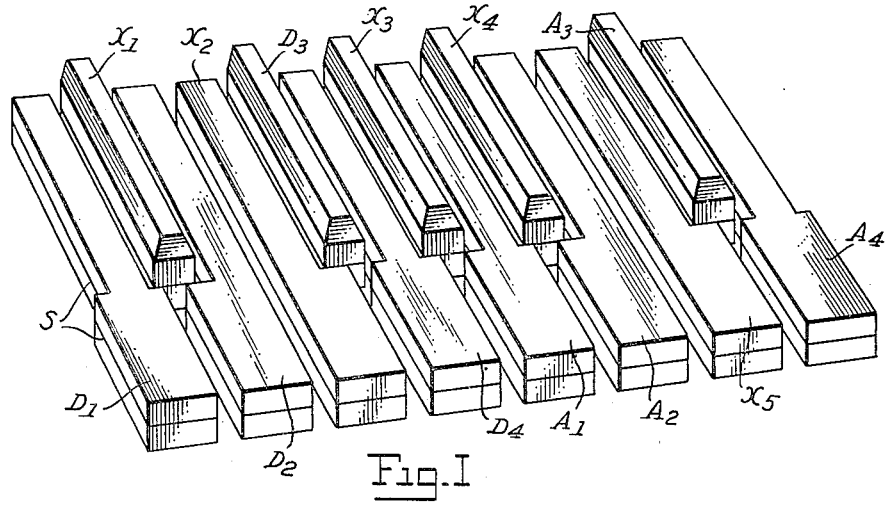
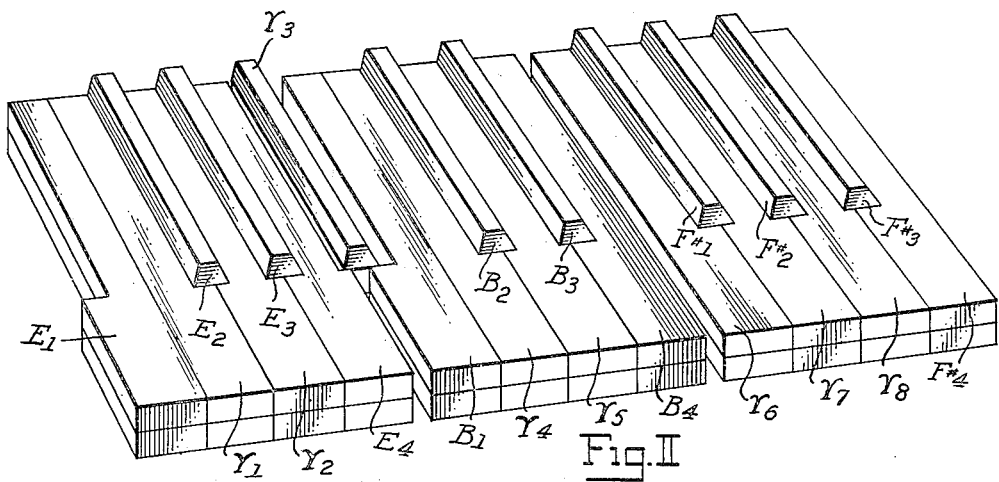
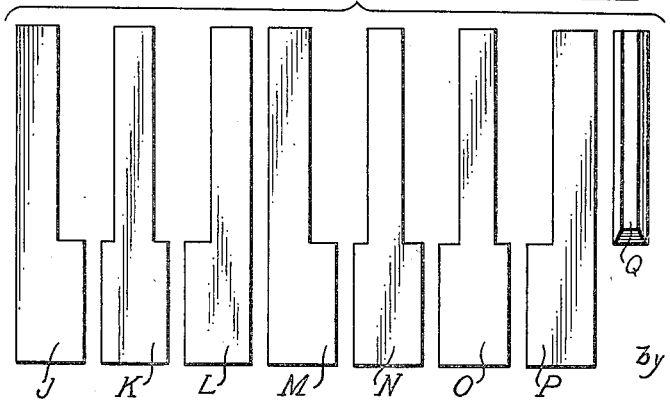
Inventor
WILLIAM H. ADAMS
by Edmund H. Parry Jr.
Attorney Patented Apr. 1, 1941

2,236,638

UNITED STATES PATENT OFFICE 2,236,638

BLOCK KEYBOARD FOR MUSICAL INSTRUCTION

William H. Adams, Fayetteville, Ark.

Application March 3, 1939, Serial No. 259,636

2 Claims. (Cl. 84—476)

This invention is directed to a device for teaching a beginning student of the piano, or similar keyboard instrument, musical scales in terms of the keys of the keyboard which compose the different scales. The device comprises a series of interfitting dummy key blocks identical in shape with the white and black keys of a piano keyboard wherein through the employment of an organized color arrangement the student may learn by visual impression the keys which make up the diatonic scales. Through the invention the student is able to quickly learn each key composing a particular diatonic scale both in relation to each other, and in relation to the keys of the keyboard interfitting therewith but not constituting a part of the keys of the particular scale.

The broad object of the invention is accomplished solely through the use of a series of blocks without the aid of associated charts or other auxiliary devices. The student may not only study the position of the blocks constituting a particular scale in their assembled relation, but in order to further impress upon him the relative positions of the scale keys, may be caused to take the blocks in disassembled condition and assemble them in correct order. By reason of the color arrangement employed the student has no difficulty in ascertaining the dummy key blocks for any designated musical scale for the latter purpose. However, since certain keys of the keyboard if accidentally arranged with their bottom side up would not fit in their correct position but might be interfitted with other blocks in an incorrect position, it is proposed according to the invention to utilize means whereby top and bottom sides of the blocks may be differentiated, and which makes it possible for the student to interfit the blocks of a particular scale only when arranged in the proper order.

According to the invention the dummy key blocks of the series which are to represent, for example, any selected major diatonic scale, will be composed of two sets of blocks, all the blocks of one set being of the same color whether or not representing white or black keys of a piano keyboard. Each set will comprise four blocks representing one of the two tetrachords composing the selected musical scale (to the octave). The two sets will be of different colors, or different shades of the same color. Through such a color arrangement each set of four blocks when assembled with the set of blocks interfitting with the right end thereof will form one diatonic scale to the octave, and when assembled with the set of blocks interfitting with the left end thereof will form a second diatonic scale to the octave.

In addition to the two successive tetrachord sets of blocks which will represent the keys of each diatonic scale, there are provided a group of further dummy key blocks interfitting with the blocks of each of the sets to represent the keyboard keys not forming a part of the diatonic scale but constituting therewith an uninterrupted line of keys composing a complete chromatic scale.

The invention may be understood by reference to the accompanying drawing wherein:

Fig. I is a perspective view of a portion of the series of dummy key blocks comprising two sets of blocks of different color which together make up the key of D major together with fill-in keys interfitting therewith;

Fig. II is a similar view showing three further successive interfitting sets of key blocks, together with fill-in keys, and wherein the middle set with the set at the left represent the key of E major, and the middle set with the set at the right represent the key of B major; and, Fig. III is a view showing the shapes of the different dummy key blocks, representing the different types of keys composing a piano keyboard.

A complete set of the dummy key blocks to build the twelve major scales will require twelve sets of four blocks, each representing one tetrachord, together with the necessary fill-in blocks representing keys of a piano keyboard not composing a part of any of the twelve major scales. For the two tetrachords sets which compose a designated scale there will be five fill-in key blocks of appropriate shape to fit therewith. As will be hereafter pointed out, however, the total number of blocks required for building all twelve major diatonic scales may be minimized by utilizing different colors on the top and bottom faces of the blocks so that the blocks may be reversed and form different scales with the bottom faces up than when their top faces are up.

Referring to Fig. I, I have therein shown a portion of the series of dummy key blocks for making up one major diatonic scale. The four blocks $D_1$, $D_2$, $D_3$ and $D_4$ comprise the set representing the D major tetrachord, the upper faces of all of such blocks being of the same color, for example, a light green. The following set of blocks $A_1$, $A_2$, $A_3$ and $A_4$ represent the keys of the A tetrachord of a piano keyboard, and in their assembled relation as shown with the first set compose the scale of D major, including the octave of the initial key block, $D_1$, as represented by key block $A_4$. The upper faces of the second tetrachord set of key blocks may be, for example, colored a dark green. By thus coordinating the color selected for the two sets composing a particular scale, it is easier for a student to select the blocks composing the two tetrachord sets from the complete series of blocks preliminary to assembling them.

In addition to the D and A sets of blocks there is also shown in Fig. I the fill-in key blocks interfitting with both sets. Such fill-in blocks, five in number, are designated $X_1$, $X_2$, $X_3$, $X_4$ and $X_5$, and the same in their assembled relation with the two tetrachord sets represent a complete chromatic scale. All of the fill-in key blocks will be of the same color, preferably a dull color, such as brown, which will readily distinguish them from the colors of any of the tetrachord sets.

Each of the tetrachord sets will be used in forming two diatonic scales to the octave, and since according to the invention each tetrachord set is distinguishable in color, the student has no difficulty in differentiating one tetrachord set from another. Further, since preferably a coordinated arrangement of color selections is used for successive tetrachord sets, the student is able to quickly select the two successive tetrachord sets which will be interfitted to form a particular diatonic scale. In Fig. II are shown three tetrachord sets of four blocks each, the left set comprising blocks $E_1$, $E_2$, $E_3$ and $E_4$, the middle set comprising blocks $B_1$, $B_2$, $B_3$ and $B_4$, and the right hand set comprising blocks $F\#_1$, $F\#_2$, $F\#_3$ and $F\#_4$. The E series of blocks with the B series of blocks represent the keys composing the scale of E major, including the octave of $E_1$ represented by $B_4$. Further the B series of blocks with the $F\#$ series represent the keys composing the scale of B major, including the octave, as represented by $F\#_4$, of the initial key $B_1$. The blocks composing the E series may be colored light blue on their top face, the B series may be colored dark blue, and the $F\#$ series may be colored a still darker color, for example, black. It will be observed that there is no difficulty in differentiating between the different tetrachord sets, since no tetrachord set in any major scale is composed of a group of keys of the same shape. Thus it will be observed in Fig. II that each of the three tetrachord sets shown are composed of differently organized groups of keys, although in each set there is a whole step between the first and second keys, a whole step between the second and third keys, and a one-half step between the third and fourth keys.

In addition to the E, B and $F\#$ sets of blocks there is also shown in Figure II the fill-in key blocks, eight in number, interfitting with the keys of all the sets. Fill-in blocks $Y_1$, $Y_2$, $Y_3$, $Y_4$, and $Y_5$ in their assembled relation with the E and B tetrachord sets represent the complete chromatic scale to the octave of E major. Similarly, fill-in blocks $Y_4$, $Y_5$, $Y_6$, $Y_7$, and $Y_8$ in their assembled relation with the B and $F\#$ tetrachord sets represent the complete chromatic scale to the octave of B major. All of the fill-in key blocks will be colored the same as in the case of the fill-in blocks of Figure I.

In Fig. III, I have illustrated the different shaped white keys J, K, L, M, N, O and P composing a piano keyboard, together with the black keys as represented by Q. The complete series of dummy key blocks will include all of the shapes shown arranged in proper order in interfitting relation with each tetrachord set composing a particular part of each diatonic scale colored with a distinguishing color as above explained. Because of the different shapes of the blocks, and the different colors of each tetrachord set, it will be evident that the student cannot fit together in improper order the blocks composing any set, and he can only fit together end to end the proper two tetrachord sets composing a desired diatonic scale.

When the student has the sets for a selected scale assembled he is able through the coloring of the blocks to fix in his mind the position of the keys which compose the scale, and also to fix in his mind the keys, represented by the fill-in key blocks, which compose with the two tetrachord sets in a diatonic scale a chromatic scale, but which are not a part of the diatonic scale.

In order that the student may not attempt to assemble the blocks with some of them top side up and others bottom side up, it is desirable that arrangement be made for distinguishing the bottom side of the blocks from the top side. To this end I prefer to employ different coloring on the bottom of the blocks of the tetrachord sets than on their top faces. Such an arrangement has the further advantage that the same blocks may be used in forming different diatonic scales when turned over, with the result that a smaller total number of blocks will serve for building all twelve major musical scales than where the blocks are designed to be employed with only their top faces up. Of course, since above pointed out, the four blocks composing one tetrachord of a major scale are of a different shape from each other tetrachord set, a tetrachord set, when the blocks are used with their bottom side up, will not constitute the same four blocks constituting a tetrachord set when the top face of the blocks is up. Thus, referring again to Fig. I, I have indicated the top halves of the blocks comprising the D tetrachord above the line S as being of a common color. However, the bottom halves of these blocks will not be all of the same color since, depending on the tetrachord to be represented with the bottom faces of the blocks up, certain blocks of the D series may form a tetrachord with certain blocks of the A series and/or blocks of still another series. Thus it will be understood that the bottom side of the blocks of the D series will not all be of a common color.

I claim:

1. A device for musical instruction comprising a first set of individual dummy key blocks of one color shaped to represent a portion of the keys of a piano keyboard for a selected major diatonic musical scale, a second set of individual dummy key blocks of a second color shaped to represent further keys of the piano keyboard making up the remainder of the selected major diatonic musical scale to the octave and assembled at one end of the first set, and a series of individual fill-in dummy key blocks of a third color interfitted with key blocks of both first two sets to represent keys of the piano keyboard intervening between and forming with the blocks of the first two sets a complete chromatic scale.

2. A device for musical instruction comprising a plurality of sets of four individual dummy key blocks, each set being shaped to represent the keys of a piano keyboard composing one tetrachord of a major diatonic scale to the octave, all key blocks in each tetrachord set being of the same color and each set being of a distinguishing different color, one tetrachord set of key blocks at one end being arranged end to end with a second tetrachord set to represent all the keys of the two successive tetrachords composing one complete major diatonic scale to the octave, and also at its opposite end being arranged end to end with a third tetrachord set of key blocks to represent all keys of the two successive tetrachords composing a second major diatonic scale to the octave, and fill-in key blocks interfitted with the key blocks of all the tetrachord sets, and representing keys of the piano keyboard composing with the keys of the respective complete major diatonic scales represented by each pair of tetrachord sets of blocks a complete chromatic scale.

WILLIAM H. ADAMS.